VARIABLE POWER DIVISION HYBRID RING DIRECTIONAL COUPLER

Filed Jan. 23, 1963 2 Sheets-Sheet 1

INVENTOR.
CHUCK Y. PON
BY
Lippincott, Ralls & Hendricson
ATTORNEYS

INVENTOR.
CHUCK Y. PON
BY
Lippincott, Ralls & Hendricson
ATTORNEYS

United States Patent Office 3,229,233

Patented Jan. 11, 1966

3,229,233

VARIABLE POWER DIVISION HYBRID RING DIRECTIONAL COUPLER

Chuck Y. Pon, San Francisco, Calif., assignor to Textron Inc., Belmont, Calif., a corporation of Rhode Island Filed Jan. 23, 1963, Ser. No. 253,319
6 Claims. (Cl. 333—11)

The present invention relates to a hybrid ring directional coupler wherein the power division ratio between the various terminal branches thereof is readily continuously variable.

Hybrid ring circuits or directional couplers formed of wave guide, transmission line, and the like, are well known, wherein a wave conduction path is provided which extends in a circle with a number of terminal branches projecting from the circular wave path at sectorial intervals thereof. The electrical lengths of the intervals between the branches are in a predetermined geometrical relationship such that power nodes and antinodes are established alternately at successive branches when electromagnetic wave power of a dominant or characteristic frequency is applied to one of the branches. In one common form of hybrid ring circuit, four terminal branches are provided, two of which are disposed at diametrically opposed points of the circular wave path and the other two of which are disposed between the first two at successive intervals of 60°. The electrical lengths of the 60° sectors between branches on one-half of the circular path are then chosen to be equal to integral multiples of one-half wavelength for a given dominant frequency. The 180° sector between the outermost pair of branches is then chosen to have an electrical length equal to the sum of the lengths of the 60° sectors, in other words a length which is a multiple of three-fourths wavelength of the given dominant frequency. Thus, when electromagnetic wave power at the dominant frequency is applied to one of the branches, the wave power splits into two components which propagate in opposite directions around the circular wave path and meet at successive branches with phases which are alternately additive and subtractive. Thus, at the branches where the oppositely propagating components of the input wave power add, power antinodes are produced; whereas, at the branches where the input components subtract, power nodes are established. The input power is hence divided between the two branches at which power antinodes are produced. Conventionally, the impedances of the sectors of path length between the branches are fixed and equal to each other. Accordingly, the input power divides between the two output branches in a fixed 1:1 ratio. Although such a fixed ratio of power division as facilitated by conventional hybrid ring couplers is useful for many purposes, still other applications exist where variable power division is desirable. For example, a hybrid ring coupler having provision for variable power division between the output branches may be advantageously used for adjusting power distribution in antenna arrays, for facilitating convenient calibrated variable power division and attenuation in the laboratory, and the like.

It is an object of the present invention to provide a hybrid ring coupler which is readily continuously variable in the division of power between the branches thereof over a wide range of ratios.

Another object of the present invention is to provide a hybrid ring coupler wherein the impedances of the sectors of circular conduction path between adjacent branches may be separately varied in a predetermined relationship to establish power antinodes at alternate branches with an amplitude ratio which is variable in accordance with the impedance variations of the respective sectors.

Still another object of the invention is the provision of a hybrid ring coupler in stripline having provision for selective coordinated variation in effective ground plane to strip conductor spacing in sectors of the circular conduction path disposed between adjacent terminal branches to vary the respective characteristic impedances of the sectors in such a manner as to vary the ratio of power division between the branches over a wide range.

A further object of the invention is the provision of a stripline variable hybrid ring coupler of the class described which is of simple compact construction and which is characterized by its simplicity of adjustment in effecting variations of power division ratio.

Further objects and advantages of the invention will become apparent upon consideration of the following description in conjunction with the accompanying drawing, wherein.

Figure 1:
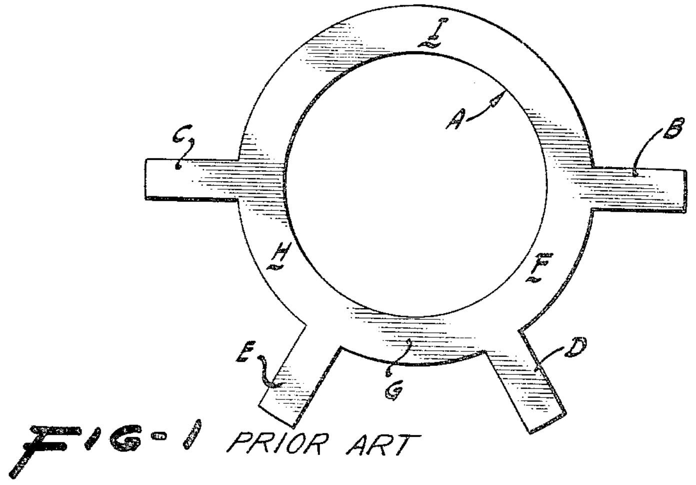
FIG. 1 PRIOR ART
FIGURE 1 is a schematic diagram of a conventional form of hybrid ring circuit.

It will be of assistance in understanding the concept of the present invention to consider at the outset a conventional hybrid ring directional coupler and the manner in which it operates. With reference to FIGURE 1, such a conventional hybrid ring circuit is schematically depicted which includes a circular wave conduction path A having circuit branches B and C coupled to diametrically opposed points thereof. The branches B and C thus divide the circular path A into two halves, one of which is provided with branches D and E at 60° intervals. Thus, sectors F, G, H of the circular conduction path are respectively interposed between branches B and D, D and E, and E and C. In addition, a 180° sector I is interposed between branches B and C. The electrical lengths of the sectors are chosen in a predetermined geometrical relationship such that, upon application of an input electromagnetic wave signal to one of the branches, for example branch B, power antinodes and nodes are alternately established at successive branches D, E, and C. In other words, power is coupled to branches D and C while a node is produced at branch E. In one geometrical arrangement for the accomplishment of the foregoing, the 60° sectors F, G, and H are each integral multiples of one-quarter wavelength for a particular dominant frequency of input signal. The electrical length of the 180° segment is then provided as an integral multiple of three-quarters wavelength of the dominant input signal frequency. Thus from any branch the electrical path length around the mean perimeter of the ring circuit A is an integral multiple of one and one-half wavelength of the dominant frequency, while the electrical length between branches is in multiples of a quarter wavelength for that frequency. In addition, the impedances of the sectors F, G, H, I are conventionally equal. Thus, when electromagnetic wave power is applied to one branch, for example branch B, two wave components of equal amplitude will travel in opposite directions around the circuit A. Since the path length in a clockwise direction from branch B to branch D is an integral multiple of one-quarter wavelength, while the path length in a counterclockwise direction is an integral multiple of one and one-quarter wavelengths, the two wave components arrive at branch D in phase, and accordingly reinforce thereat to produce a power antinode. The clockwise path length between branch B and branch E on the other hand is a multiple of a half wavelength, while the counterclockwise path length is a multiple of one wavelength. The two oppositely propagating wave components accordingly reach terminal E in a 180° phase relationship. Destructive interference hence occurs at branch E and a power node is produced thereat. A power antinode or maximum is produced at branch C in a similar manner to the antinode produced at branch D, inasmuch as the electrical path length in opposite directions around the ring circuit between branches B and C are both multiples of a quarter wavelength of the dominant input signal frequency. Furthermore, since the impedances of the paths traversed by the wave components arriving at branch D are equal to those of the paths traversed by the wave components arriving at branch C, it will be appreciated that the input power applied to branch B is equally divided between branches D and C. Since the impedances of the sectors are fixed, no variation from the foregoing 1:1 power division ratio is possible in conventional hybrid ring couplers.

The present invention overcomes the foregoing disadvantage by providing a hybrid ring coupler which is variable in the power division ratio between branches. More particularly, the coupler of the present invention generally comprises a hybrid ring circuit of the type depicted in FIGURE 1 and hereinbefore described, which has a plurality of branches disposed in a predetermined geometrical relationship to produce power nodes and antinodes alternately at successive branches when input power is applied to one of the branches. The coupler further includes variable impedance means associated with circular conduction path for separately varying the characteristic impedances of the respective conduction path sectors interposed between the branches of the circuit. The variable impedance means is such that the impedances of the respective sectors may be varied by different amounts. Preferably, the impedances of alternate sectors are equal, while the impedances of adjacent sectors are different and the impedance variation of adjacent sectors is effected in opposite directions. For example, in the circuit of FIGURE 1 the impedances of sectors F and H might be equal and varied in one direction, while the impedances of sectors G and I might be equal but different from those of sectors F and H and varied in the opposite direction. Accordingly, the impedance changes which may be effected in, for example, F and H, are disproportionate to the impedance changes effected in sectors G and I, and accordingly the wave components propagating around the ring circuit may be correspondingly disproportionately attenuated as desired whereby varied ratios of the power at branch C to the power at branch D, for example, are produced. By virtue of the variable impedance means for separately varying the impedances of the sectors of the circular conduction paths in the foregoing manner, a very wide range of variable power ratios is readily attained.

Figure 2:
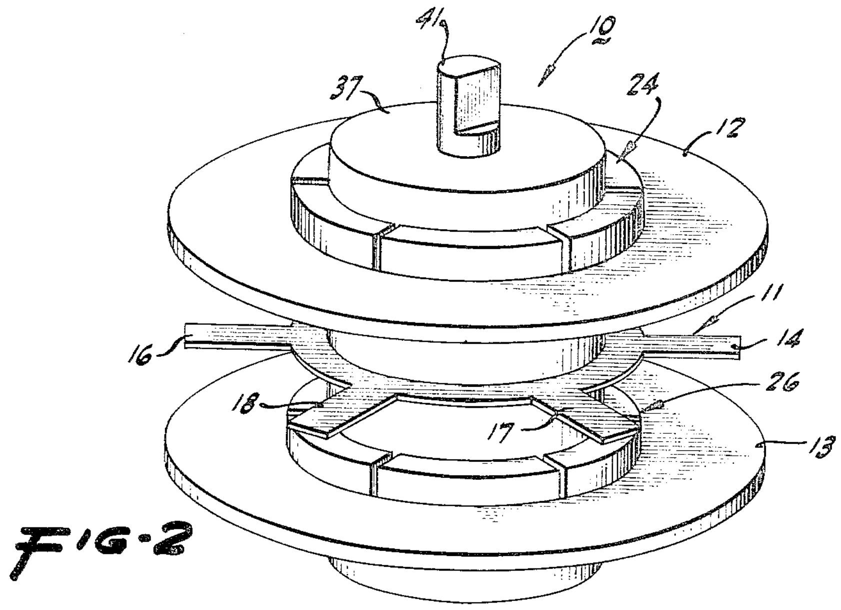
FIGURE 2 is a perspective view of a preferred embodiment of the variable hybrid ring directional coupler of the present invention as arranged for employment with stripline.
Figure 3:
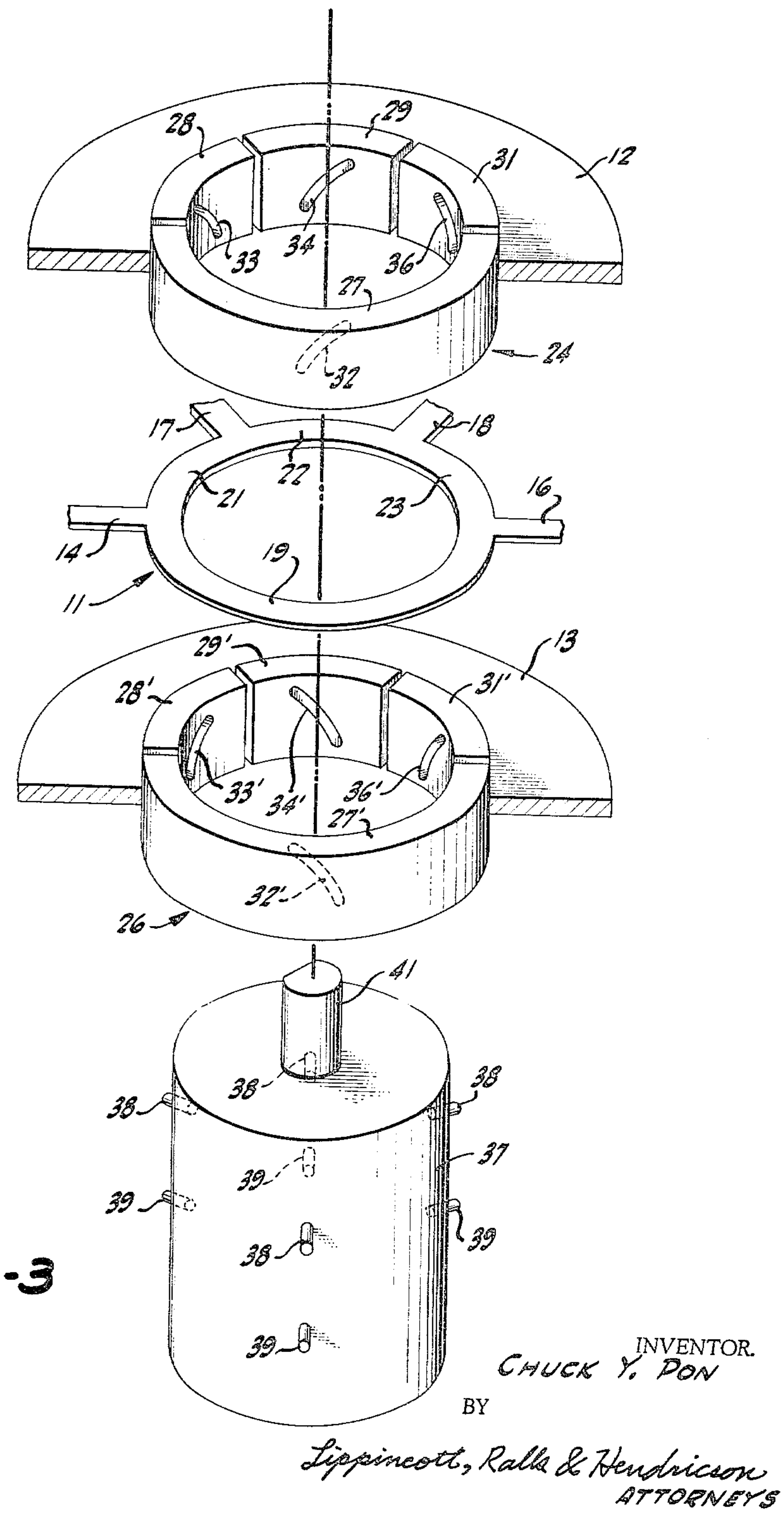
FIGURE 3 is an exploded perspective view of the stripline coupler of FIGURE 2.

Considering now the variable power division ratio hybrid coupler of the present invention in greater detail as to a preferred structural embodiment thereof adapted for employment with stripline, and referring to FIGURES 2 and 3, a stripline hybrid ring circuit 10 is defined by a strip ring conductor 11 and a pair of annular ground plane conductors 12, 13 coaxially disposed on opposite sides of the strip ring. A plurality of stripline branches project from the ring 11 at predetermined sectorial intervals commensurate with a geometrical relationship of the type discussed hereinbefore relative to the conventional hybrid ring circuit of FIGURE 1. For example, as illustrated, four radially projecting branch arms 14, 16, 17, 18 are provided which correspond to the branches B, C, D, E of the circuit depicted in FIGURE 1. The spacing between ground plane conductors 12 and 13 and the width of the respective branch arms determine their characteristic impedances. Striplines having impedances matched to the arm impedances may, of course, be readily coupled between the arms and ground plane conductors to connect the coupler in a desired circuit.

The characteristic impedance of the stripline hybrid ring circuit 10 is a function of the width and thickness of the strip ring 11, the spacing between the ground plane conductors 12, 13, and the dielectric constant of the medium within the spaces between the strip conductor and ground plane conductors. In accordance with the present invention, the width and thickness of the strip ring and dielectric constant of the medium are held constant, while the spacings between the ground plane and strip conductors in the sectorial intervals between branches are separately variable in a manner subsequently described to consequently vary the impedances thereof in disproportionate amounts commensurate with variable power division between the branches. More particularly, means are provided to disproportionately vary the respective spacings between the strip ring 11 and ground plane conductors 12, 13 in regions of the wave conduction path adjacent strip ring sectors 19, 21, 22, 23, respectively interposed between arms 14 and 16, 14 and 17, 17 and 18, and 18 and 16.

To facilitate the foregoing variation of the effective spacing between the strip ring 11 and ground plane conductors 12, 13 to separately vary the characteristic impedances of the respective sectors of the ring circuit in a coordinated manner in accordance with the basic variable power division concept of the present invention, a pair of segmented conducting rings 24, 26 are coaxially disposed within the central apertures of ground plane conductors 12, 13, in freely slidable contacting relation thereto. Both rings 24, 26 are similar and accordingly only ring 24 is described in detail herein, like primed numerals being applied to ring 26 to designate corresponding parts. Ring 24 is defined by abutting annular sectorial segments 27, 28, 29, 31 of electrically conducting material, which segments respectively are aligned with, and have arc lengths comparable to the sectors 19, 21, 22, 23 of the strip ring 11. The segments may be moved through the ground plane conductor 12 into and out of the space between the strip ring conductor and ground plane conductor. In a like manner, the segments of ring 26 may be moved through ground plane conductor 13 into and out of the ring circuit path, and preferably the direction of translation of the segments of ring 26 is opposed to that or the corresponding segments of ring 24. For each sector of the conduction path, the characteristic impedance thereof varies as the spacing between the corresponding segments of the rings 24, 26, such segments being in effect elements of the ground plane conductors and determining the ground plane to strip ring spacing for the respective sectors of the conduction path.

A variety of mechanisms may be employed to facilitate movement of the segments of the rings 24, 26. In accordance with one particularly advantageous arrangement as illustrated in the drawing, the segments 27, 28, 29, 31 are respectively provided with arcuate slots 32, 33, 34, 36 centrally of their inner circumferential surfaces. Preferably, the slots 32, 34 are the same curvature, while slots 33, 36 are of an opposite curvature. In addition, the slots of the segments of the other ring 26 have opposite curvatures from the slots of corresponding segments of the ring 24. In other words, the slots 32′, 33′, 34′, 36′ have curvatures opposite to slots 32, 33, 34, 36. With slots provided in the segments of the rings 24, 26 in the manner just described, the structure is then completed by a rotary cylinder 37 which extends coaxially through the central apertures of the rings 24, 26 in rotatable relation thereto and is provided with a first set of radially projecting pins 38 in respective engagement with the slots of the segments of ring 24 and a second similar set of pins 39 in respective engagement with the slots of the segments of ring 26. Upon rotation of the cylinder 37, the pins 38, 39 in moving through the arcuate slots of the ring segments effect longitudinal translation thereof towards or away from the sectors of the strip ring depending upon the direction in which the cylinder is rotated. By virtue of the particular orientations of the slots of the respective segments previously described, adjacent segments of each ring move in opposite longitudinal directions, as do corresponding segments of the respective rings. For example, upon clockwise rotation of the cylinder, segments 27, 27' and segments 29, 29' are translated outwardly relative to the strip ring 11 to increase the air space in the regions of sectors 19 and 22 and accordingly increase the characteristic impedances thereof. Segments 28, 28' and segments 31, 31', on the other hand, are moved towards the strip ring to decrease the air space adjacent sectors 21 and 23 and thereby decrease the characteristic impedance of the corresponding sectors of the conduction path. Furthermore, the movements of the alternate sets of segments are equal such that the impedances of the corresponding alternate conduction path sectors are equal for each given setting of the ring segments.

To facilitate rotation of the cylinder 37, same may be advantageously provided with a shaft 41, and the angular displacement of the cylinder may be calibrated according to the ratios of impedances of adjacent sectors to thus provide indications of the division of power between branches. Thus, for each rotary setting of the shaft, power applied, for example to arm 14, will hence be efficiently delivered to arms 16 and 17 with a different ratio of division therebetween. Upon rotation of the shaft the power division ratio is, of course, varied by virtue of the changes in the impedances of adjacent sectors effected.

It will be appreciated that the impedance changing principles advanced hereinbefore relative to the specific stripline hybrid ring coupler, may as well be readily adapted to various other forms of hybrid ring couplers such as those formed of waveguides and the like. Accordingly, it is to be understood that the invention is not limited to the specific embodiment herein described in detail and illustrated in the drawing and that changes may be made therein without departing from the scope of the invention as defined in the appended claims.

What is claimed is:

1. A variable power division ratio hybrid ring directional coupler comprising a hybrid ring including longitudinally spaced conducting walls defining a circular wave conduction path with first and second terminal branches projecting from diametrically opposed points of the path and second and third terminal branches projecting from equally spaced-apart points of one of the halves of said path defined between said first and second branches, said conduction path having first, second, and third sectors of equal electrical length respectively interposed between said first and third, third and fourth, and fourth and second branches, said conduction path having a fourth sector with an electrical length equal to the total electrical length of said first, second and third sectors interposed between said first and second branches, a plurality of conducting sectorial segments corresponding to said sectors of said conduction path mounted for longitudinal translation into and out of said sectors and in contact with one of said conducting walls, and means coupled to said segments for selectively effecting translation of adjacent ones thereof in opposite directions and translation of alternate ones thereof through equal distances.

2. A variable power division ratio hybrid ring directional coupler comprising a hybrid ring circuit defined by at least a pair of coaxially spaced electrically conducting annular members with at least one member having a plurality of radially projecting branches to divide said one member into a plurality of sectors, said sectors having electrical lengths in a predetermined proportional relationship to each other consonant with the establishment of power nodes and antinodes alternately at successive ones of said branches in response to the input of electromagnetic wave power to one of said branches, a plurality of electrically conducting sectorial cylindrical segments corresponding to said sectors of said one member and coaxially movable centrally through the other member of each pair thereof, adjacent ones of said segments having arcuate slots of respectively opposite curvature in their inner surfaces, and an adjusting cylinder extending coaxially through said segments and rotatable therein, said cylinder having radially projecting pins respectively engaging the slots of said segments, whereby rotation of said cylinder effects coaxial movement of adjacent ones of said segments in opposite directions to vary the impedances respectively between adjacent branches of said ring circuit and thereby vary the power output ratio therebetween.

3. A stripline variable power division ratio hybrid ring directional coupler comprising a conducting strip ring, a pair of annular ground plane conductors respectively coaxially disposed on opposite sides of said strip ring in equal spaced relation thereto, means for connecting a plurality of electrical circuits to said strip ring and ground plane conductors at a plurality of points dividing same into a plurality of sectors, said sectors having electrical lengths in a predetermined relationship to each other to establish power nodes and antinodes alternately at successive ones of said points of circuit connection in response to the input of electromagnetic wave power to one thereof, first and second electrically conducting rings respectively coaxially movable through and in contact with said annular ground plane conductors in and out of the spaces between said ground plane conductors and said strip ring, said conducting rings each formed of sectorial segments corresponding to said sectors, and translating means coupled to said conducting rings for moving adjacent segments of each one thereof and opposed segments of respective ones thereof in opposite coaxial directions.

4. A stripline variable power division ratio hybrid ring directional coupler according to claim 3, further defined by said segments of said conducting rings having arcuate slots longitudinally of their inner surfaces with the slots of adjacent segments of each conducting ring having opposite curvatures and the slots of the segments of the first conducting ring having curvatures opposite to the slots of the segments of the second conducting ring, and said translating means comprising a rotatable cylinder coaxially disposed within said first and second conducting rings, said cylinder having a first set of radially projecting pins engaging said slots of the segments of said first conducting ring and a second set of radially projecting pins engaging said slots of the segments of said second conducting ring.

5. A stripline variable power division ratio hybrid ring directional coupler comprising a conducting strip ring, at least one annular ground plane conductor coaxially spaced from said strip ring, means for connecting a plurality of electrical circuits to said strip ring and ground plane conductors at a plurality of points dividing same into a plurality of sectors, said sectors having electrical lengths in a predetermined relationship to each other to establish power nodes and antinodes alternately at successive ones of said points of circuit connection in response to the input of electromagnetic wave power to one thereof, and means for separately varying the effective ground plane conductor to strip ring spacing of alternate sectors by equal amounts and of adjacent sectors by disproportionate amounts to thereby vary the characteristic impedances of the corresponding sectors in a disproportionate relationship productive of variable ratios of power division between said points of circuit connection at which power antinodes occur.

6. A variable power division hybrid ring directional coupler comprising a hybrid ring including means defining a wave conduction path extending in a circle with terminal branches projecting from the circle at sectorial intervals of circular path length, said branches being adapted for the input and output of electromagnetic wave power and said sectorial intervals having electrical lengths in a predetermined relationship to each other consonant with the establishment of power nodes and antinodes, alternately, at successive branches in response to the input of electromagnetic wave power to one of said branches; at least one ground plane conductor having electrically connected segments corresponding to sectorial intervals of said wave conduction path between branches thereof and aligned with said sectorial intervals; and means coupled to said ground plane conductor segments for selectively translating adjacent segments perpendicularly of said wave conduction path for varying the impedances of the wave conduction path intervals to vary the ratio of power division between branches.

References Cited by the Examiner

UNITED STATES PATENTS 2,749,521 6/1956 Engelmann et al. ------ 333—11

OTHER REFERENCES

Pon, C. Y.: "Hybrid-Ring Directional Coupler for Arbitrary Power Divisions," Trans. I.R.E., 1961, MTT 9, page 529.

HERMAN KARL SAALBACH, *Primary Examiner.*